United States Patent [19]

Lötzsch et al.

[11] 4,078,122
[45] Mar. 7, 1978

[54] BATTERY TERMINAL CONSTRUCTION

[75] Inventors: Ulrich Lötzsch; Heinz Schuster, both of Hagen, Germany

[73] Assignee: Varta Batterie Aktiengesellschaft, Germany

[21] Appl. No.: 705,515

[22] Filed: Jul. 15, 1976

[30] Foreign Application Priority Data

Jul. 29, 1975   Germany ............................. 7524020

[51] Int. Cl.² ............................................. H01M 2/30
[52] U.S. Cl. .................................. 429/121; 429/178; 429/184

[58] Field of Search ............... 429/121, 122, 178, 179, 429/180, 181, 182, 183, 184, 164, 166

[56] References Cited

U.S. PATENT DOCUMENTS

| 1,734,145 | 11/1929 | Piper | 429/121 |
| 2,387,590 | 10/1945 | Koenig et al. | 429/184 |

Primary Examiner—Donald L. Walton
Attorney, Agent, or Firm—Weiser, Stapler & Spivak

[57] ABSTRACT

Lead storage battery terminals are equipped with inserts of high conductivity, high strength metal, having protruding portions in the form of annular loops mounted at right angles to the terminals.

11 Claims, 12 Drawing Figures

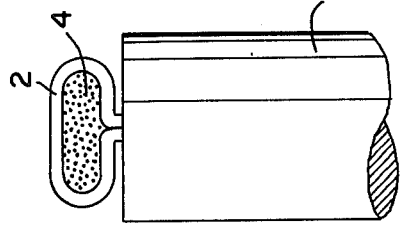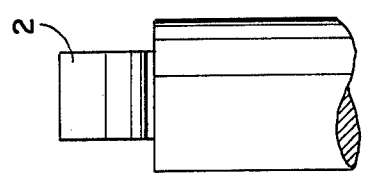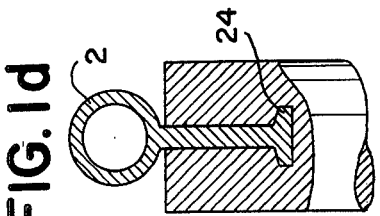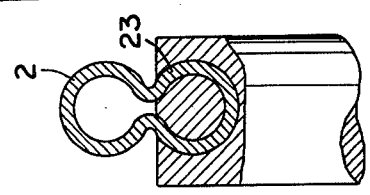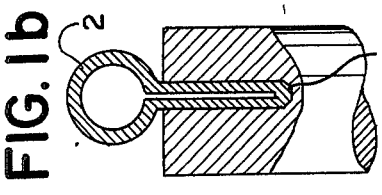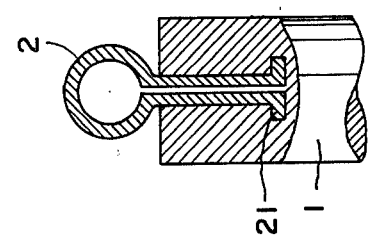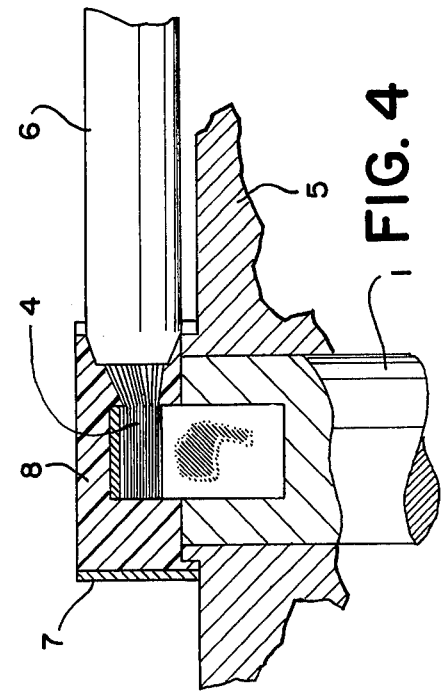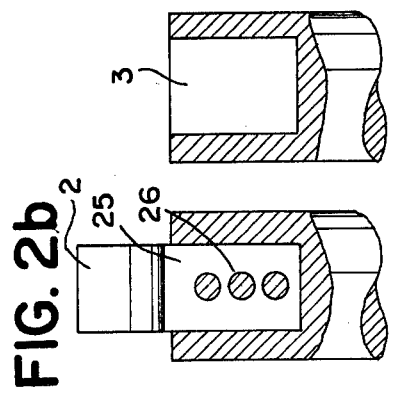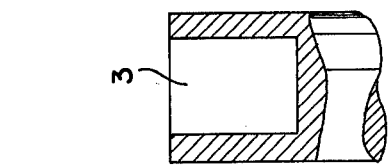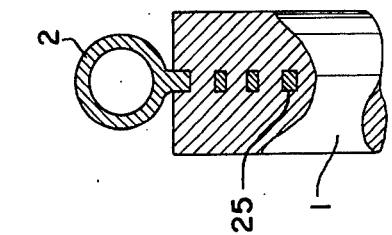

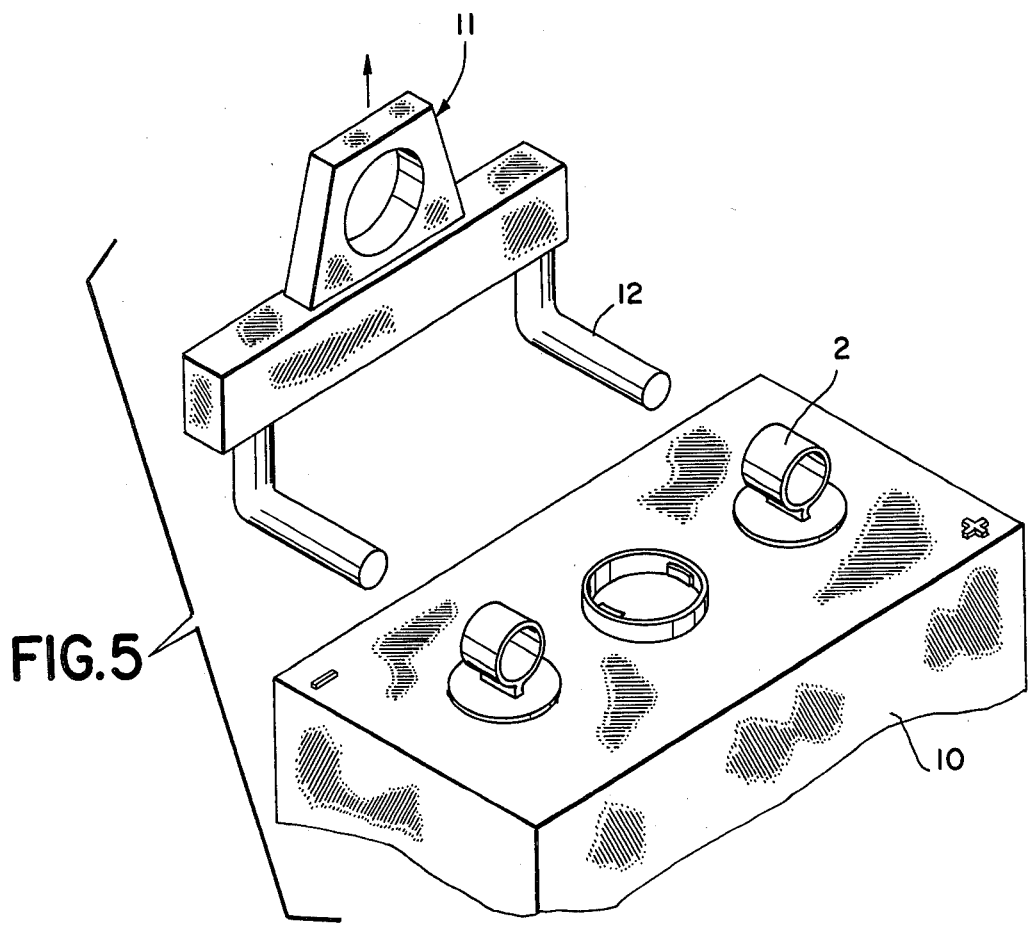
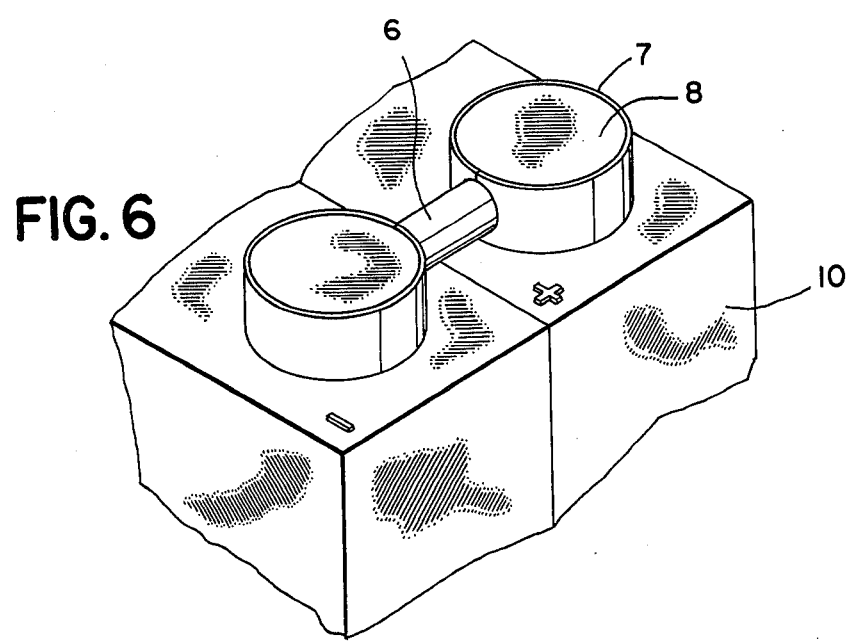

BATTERY TERMINAL CONSTRUCTION

The improvement relates to an electric storage battery, and particularly a storage battery for vehicles.

In various areas of application, and particularly when used in vehicles, storage batteries are exposed to unusual mechanical loads such as shocks. In storage batteries consisting of separate, connected-together cells, this creates high mechanical strains upon the pole connections between the individual storage battery cells. For that reason, storage batteries used, for example, in vehicles, utilize flexible and elastic pole connections, made of materials exhibiting the lowest possible fatigue characteristics. A further requirement imposed upon such lead storage battery cells is that their overall height be as small as possible, so that the height of the electrical connections among the cells should also be as low as possible.

Accordingly, it is an object of the invention to provide storage batteries which are resistant to shock and particularly, whose connections between individual cells are so resistant.

It is another object to provide such storage batteries in which the connections between cells are comparatively low, so that the overall height of the batteries is correspondingly low.

These and other objects which will appear are achieved in accordance with the present improvement by providing the terminals with an insert of a metal having lower electrical resistance than lead and higher mechanical strength than lead. The protruding ends of the terminals are in the form of a tubular loop whose axis may be at right angles to the axis of the terminal itself.

The tubular loop and terminal insert are preferably made of copper. However, they may also be of aluminum.

For further details, reference is made to the discussion which follows in the light of the accompanying drawings wherein FIGS. 1a through 1e and 2a through 2c show, partly in cross-section, various embodiments of terminals with inserts in accordance with the improvement;

FIG. 3 shows such a terminal after introduction of a connector cable;

FIG. 4 shows the completed terminal;

FIG. 5 shows an arrangement for lifting a cell having terminals in accordance with the improvement; and FIG. 6 shows two interconnected cells having terminal connectors in accordance with the improvement.

The same referenced numerals are used throughout the figures to denote similar elements.

Referring to the FIGS. 1a through 1e these all include a terminal 1, formed of lead, and each having an insert with an end protruding from the terminal, this end being in the form of a tubular loop 2. Its axis is preferably at right angles to the axis of terminal 1. The portion of the insert which is cast into terminal 1 may for example, as shown in FIGS. 1a and 1b, be provided with angular protrusions 21 or 22, respectively, in order to anchor the insert in the terminal. In the embodiment of FIG. 1a the tubular loop, as well as the portion inserted in terminal 1 may, for example, be made of a strip of sheet metal which is angled at its ends 21. Between the two parts of this sheet metal strip there is a space which becomes filled with lead during casting. As shown in FIG. 1b, this space may also be omitted.

As shown in FIG. 1b, insert portion 22 within the terminal may be produced by squashing a portion of a larger tube. As shown in FIG. 1b the insert portion 23 may also be in the form of a tubular loop. In that case, the entire insert may consist of a double tube. FIG. 1e shows a side view of any of the terminal arrangements shown in FIGS. 1a through 1b.

In FIG. 2a the insert in the terminal material, which may be a sheet metal strip 25, is provided with transverse apertures 26. FIG. 2b shows a side view of this same construction. Such an insert can be placed in a hollow 3 (shown in FIG. 2c) of the terminal 1 and then be anchored within this terminal 1 by melting lead therein. The apertures 26 then provide additional mechanical strength.

Into tubular loop 2 there is then inserted the and 4, with insulation stripped off, of a flexible connector cable 6, after which the tubular section 2 is crimped. This produces additional deformation which further reduces the overall height, as appears from FIG. 3. Thereafter, a slotted collar 7 is placed around this area. Through the slot in this collar, a cable connector 6 is inserted and the collar itself rests upon cell lid 5. The space between terminal 1, tubular loop 2 and collar 7 may be filled with a casting 8 which also protects the upper end of the terminal with respect to the outside. This mass provides insulation and may be made of a wide variety of materials, such as bitumen, polyisobutylene with various fillers such as Oppanel or polyurethane.

FIG. 6 shows two cells 10 provided with a connection between their terminals in accordance with the foregoing description.

The tubular insert also make it possible to conveniently transport the cells 10 before the connector cables are crimped in place. For this there may be used, for example, the lifting tool 11 shown in FIG. 5, whose tines 12 are inserted into the tubular loop 2.

We claim:

1. A lead storage battery having terminals made of lead and characterized in that;
    the terminals have inserts made of metal having lower electrical resistance and higher mechanical strength than lead,
    the inserts having a portion protruding from the top of the terminal,
    the protruding portion being in the shape of a tubular loop with axis at an angle to the axis of the terminal.

2. The apparatus of claim 1 wherein the axis of the tubular loop is substantially at right angles to the axis of the terminal.

3. The apparatus of claim 2 wherein the insert including the tubular loop is of copper.

4. The apparatus of claim 2 wherein the insert including the tubular loop is of aluminum.

5. The apparatus of claim 2 wherein the portion of the insert within the terminal is provided with apertures penetrated by the lead of the terminal.

6. The apparatus of claim 2 wherein the portion of the insert within the lead terminal is provided with lateral protrusions.

7. The apparatus of claim 2 further comprising a flexible cable having an end portion with insulation stripped off, the end portion being crimped in the tubular loop.

8. The apparatus of claim 7 further comprising a slotted collar surrounding the terminal and the cable crimped in the tubular segment, the space within the collar being filled with a cast block of insulating material.

9. The apparatus of claim 8 wherein the cast block also covers the exposed surface of the terminal.

10. The apparatus of claim 1 wherein the insert extends substantially coaxially into the lead terminal.

11. The apparatus of claim 7 wherein the crimping is such as to compress the tubular loop into a horizontally elongated configuration.

* * * * *